A. TOMASSETTE.
SAFETY MOTOR VEHICLE.
APPLICATION FILED JUNE 5, 1922.

1,438,878.

Patented Dec. 12, 1922.

Anthony Tomassette.
INVENTOR

BY Victor J. Evans
ATTORNEY

WITNESS:

Patented Dec. 12, 1922.

1,438,878

UNITED STATES PATENT OFFICE.

ANTHONY TOMASSETTE, OF PHILADELPHIA, PENNSYLVANIA.

SAFETY MOTOR VEHICLE.

Application filed June 5, 1922. Serial No. 566,079.

*To all whom it may concern:*

Be it known that I, ANTHONY TOMASSETTE, a citizen of the United States, residing at Philadelphia, in the county of Philadelphia and State of Pennsylvania, have invented new and useful Improvements in Safety Motor Vehicles, of which the following is a specification.

This invention relates to safety motor vehicles provided with bullet-proof armour, a rotatable turret and an automatic machine gun thereon so that a driver and a guard may be safely protected by the armour against attack and operate the vehicle and gun; the vehicle being especially intended to be used to safely transport considerable sums of money or other valuables from place to place.

The object of my invention is to provide a safety vehicle of such character and construction that an armoured housing or body can be placed upon the chassis of the ordinary motor vehicle and safely protect the occupants and contents of the vehicle from injury, damage or loss in the event of attack from without.

Another object is to provide a housing and auxiliary part of my device of such character that a rotatable turret may be carried on the vehicle substantially as a part of the housing within which means for operating the turret and a machine gun mounted thereon and partly projecting therefrom may be provided and operated by a guard seated in the turret portion of said housing.

Other objects and advantages of my invention will hereinafter appear as the construction and operation of the mechanism provided is more fully explained.

In the further disclosure of the invention reference is to be had to the accompanying sheet of explanatory drawings constituting a part of this specification and in which like characters of reference designate the same or corresponding parts in all the views.

Figure 1:
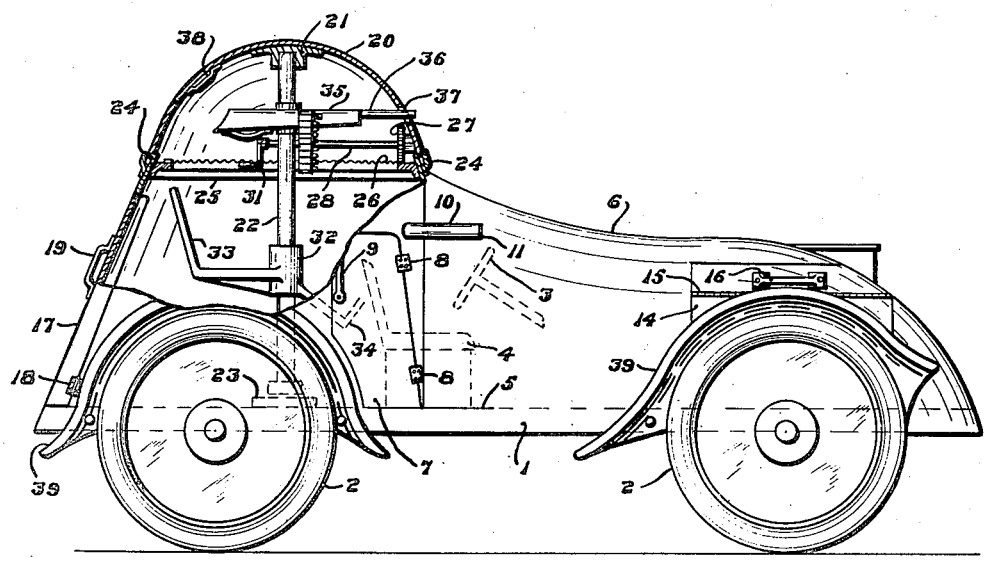
Figure 1 is a side elevation of my device applied to a motor vehicle with a part of the rear of the housing and turret broken away and in cross section.
Figure 2:
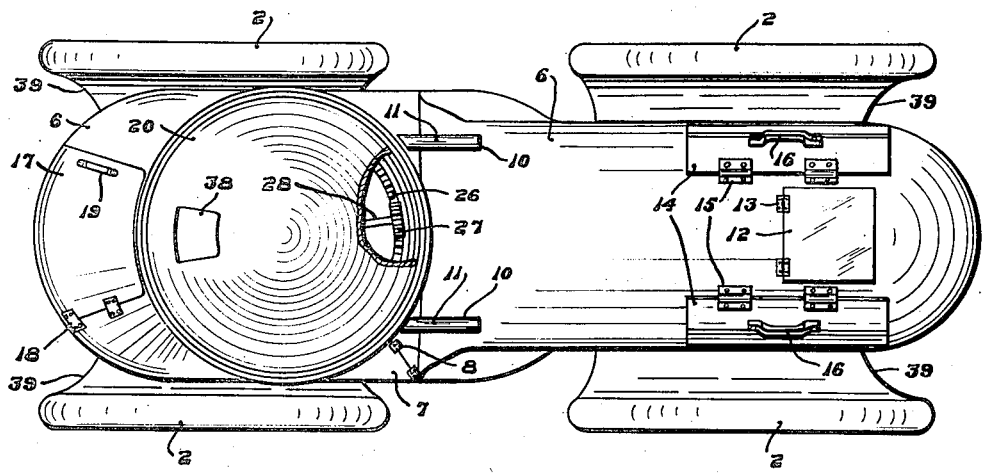
Figure 2 is a plan view of my device showing a part of the turret broken away and a portion of the turret rotating means being visible.

Referring more particularly to the drawings, on the chassis 1 of an ordinary motor vehicle, having the usual carrying wheels 2 the usual arrangement of steering wheel 3 near a driver's seat 4 and a base or flooring 5 of the chassis frame, I mount an enclosing armoured bullet proof housing 6 extending the length of the chassis 1 and entirely covering the operating parts of the vehicle and enclosing the occupants and contents of the vehicle. This armoured housing 6 can be made of steel or any other metal or suitable substance having a sufficient hardness and resistance to prevent the penetration of bullets or other missiles in the event of an attack on the vehicle, by thieves or others, intent on bodily harm to the occupants or the obtaining of any valuable contents of the machine.

The armoured housing 6 is in all parts of suitable curvilinear contour to more readily deflect bullets or missiles from the outside and to afford space to suitably house the occupants of the vehicle and the operating mechanism of the vehicle and the protecting devices within the housing.

The driver's seat 4 is placed substantially midway the length of the vehicle chassis 1 in convenient relative position to the steering wheel 3 and to permit the entrance and exit of the driver and other occupant or contents of the vehicle body there is provided a side door 7 securely attached to the housing 6 by the hinges 8. This door is provided with an opening handle 9 and means are provided for securely locking the door from the inside when the car is occupied. Conveniently located near the driver there is provided in the housing 6 on either side of the driver's seat 4 a sight opening or slot 10, by means of which the driver can determine the direction of travel. This slot is suitably closed by a transparent member 11 of glass or other suitable substance of sufficient strength and thickness to afford reasonable protection against attack and prevent penetration of bullets. It is understood also that these slots 10 would necessarily be only of such size as to permit convenient sighting therethrough. There is also a second sight hole in the forwardly curved portion of the housing 6, which is covered by a door 12 mounted on the housing 6 by hinges 13 and this door 12 can be controlled by the driver by suitable means within the housing 6, so that said door 12 may be opened or closed at will. Doors 14 on opposite side of the forward part of the housing 6 are mounted to the housing 6 on hinges 15 and provided with handles 16 so that they may be opened or shut to gain access to the motor mechanism of the vehicle carried in that portion of the housing. The doors before mentioned are all constructed of armour material.

The rear portion of the housing 6 back of the driver's seat 4 is substantially the shape of a truncated cone with an approximately hemispherical top. In the rear of this portion of the housing 6 there is a door 17 mounted on the housing by hinges of 18 and a handle 19 by which the door 17 may be opened or shut from the outside. This door from its entrance or exit to or from the conical rear portion of the housing 6 may be securely locked from the inside when the conical portion of the housing is occupied.

The approximately hemispherical top of the rear truncated conical portion of the housing is, as a matter of fact, a rotatable armour turret 20. This turret 20, shown in cross section in Figure 1 is, as will be understood, of armoured material, similar to that of the other body portion of the housing and is shaped substantially as a hemisphere. On its inner face, at the top and centrally located thereon is a seat or bearing 21, which is fixed to and moves with the turret 20.

The bearing or seat 21 is in fixed engagement with a shaft 22 to the upper end of which it is held by a pin set screw or other suitable means. The shaft or axle 22, which partially supports the weight of said turret 20 and upon which said turret rotates, extends downwardly and has its lower end rotatably incased in an end thrust bearing or seat 23 which is mounted on and carried by the flooring 5 of the chassis.

The turret 20, rotating with the shaft or axle 22, has its bottom peripheral edges resting on and guided by an annular ball-bearing 24, which makes the turret easily rotated and which, because a lid like portion of the ball-bearing box engages the outer surface of the turret 20 near its edge, prevents the displacement of the turret from its operating position. Within the turret 20, but actually supported on the inner face of the upper portion of the truncated cone shaped rear portion of the housing 6, near its top edges, is an annular tooth ring or rack 25, in rigid engagement with the rear conical housing portion, and provided with a continuous series of teeth 26 on its upper surface. With the tooth rack 26, a pinion 27 meshes. This pinion 27 is mounted on and rotates with a shaft 28, which is rotatably mounted at one end in a bearing 29 carried on the inner face of the turret 20 near its bottom edge and near its other end in a bearing, not shown, on the axle 22 and is provided with a crank handle 31 at one end, in convenient reach of a guard within said conical rear portion of the housing 6, by the operation of which the turret and supporting axle can be rotated, by the action of the rack 26 and the pinion 27, to any desired extent.

At a convenient height on the axle 22, I provide a collar 32 which is rotatable on and with the said axle 22 and which carries a seat 33 and a foot-rest 34, which may be occupied by a guard in this portion of the housing 6. Above said seat 33 and mounted on said axle 22, rotating therewith and the rotation of the turret 20, and radially disposed from said axle 22, is an automatic machine-gun 35, having its barrel 36 extending outwardly through an opening 37 in proper position in the dome of the turret 20.

A suitable collar or swivel clamp engaging the gun and axle 22 can be used to mount the gun 35 as described. This gun is of any suitable pattern and can be operated by the guard in its usual manner of operation, when positioned to be fired.

In the dome of the turret 20, I also have a sliding door 38, which may be conveniently positioned and controlled from within the turret 20, that may be opened for ventilation or sight and may be locked and closed from within. This door as the others in my device, is made of the same armoured material as the housing 6.

The wheels too are covered above with arc shaped armoured shields 39, which will protect the wheels and tires from damage, from bullets fired from above or from in front of or back of the car.

The use and operation of my device will be understood by the following description. If it is desired to transport moneys or valuables in considerable amount by a motor vehicle and insure, as much as may be, their safety of delivery, the armed and armoured features of my device will be seen to have advantages.

The driver and driving mechanism is encased in the housing with convenient sights and openings to permit the proper operation of the vehicles. The valuables may be securely stored in the armoured portion of the housing or an especially armoured portion thereof, while any attack upon the car can be combated by the guard carried in the rear turreted portion of the vehicle. The guard sitting in the seat 33, through the openings 37, 38 and 10 can see any approaching attack on the vehicle. Should it be desired to fire the gun 35, the guard turns the crank 31 to actuate the pinion 27 which moves in the rack 26 and turns the turret 20, the axle 22, the gun 36, thereon and the seat 33 on the axle 22, simultaneously into any desired position or direction of rotation, while the seat and gun and crank retains the same position relative to each other and to the turret. It will be seen thus, that the gun may be aimed and fired by a guard enclosed safely in the armoured turreted rear portion of the housing, and that the firing direction of the gun 35 may by this rack and pinion means, be changed at will by the operation of the crank 31. An effective defense against attack is thus provided and the safety of the occupant and contents of the vehicle reasonably assured—which is the primary purpose of my device.

Having described my invention, what I claim as new and desire to secure by Letters Patent is:

1. In a safety motor vehicle the combination with a chassis of an armoured housing mounted thereon, a rotating gun turret supported thereby, a vertical axle rotatably mounted on said chassis centrally engaging the turret and rotating therewith, a gun mounted on said axle radially disposed to the turret and rotating with said turret and axle, an annular rack carried by the armoured housing, a pinion carried by said turret and meshing with said annular rack, and means carried by the axle and turret to rotate said pinion and thereby simultaneously rotate said turret, axle and gun.

2. In a safety motor vehicle the combination with a chassis of a closed armoured housing of a substantially invert U-shaped forward portion and a substantially truncated conical shaped rear portion, lockable means to permit entrance into and exit from said housing, a rotating gun turret supported on said truncated conical portion, a gun mounted within said turret and rotating therewith, an annular rack carried by the armoured housing, a pinion carried by the turret and meshing with said annular rack, and means carried by said axle and turret to rotate the pinion and thereby rotate said turret and gun simultaneously.

3. In a safety motor vehicle the combination with a chassis of a closed armoured housing having a curvilinear substantially invert U-shaped forward portion and a truncated conical shaped enlarged rear portion with a hemispherical shaped top mounted on said rear portion, a closable forward end, sight window and laterally closed sight windows provided in said invert U-shaped forward armoured housing, a closable side door and back door provided in said enlarged truncated conical rear portion of the housing, a slidably closed lookout and an opposite gun port-hole provided in the rotatable hemispherical top portion of the housing, and means within said rear truncated conical portion and said hemispherical top portion to rotate said top and slidably mount a gun.

4. In a safety motor vehicle the combination with a chassis of a closed armoured housing having a substantially truncated conical shaped enlarged rear portion mounted on said chassis, a rotating substantially hemispherical shaped gun turret supported on said truncated rear portion, a vertical axle mounted on said chassis centrally engaging said turret and rotating therewith, a gun mounted on said axle and rotating therewith, and an annular rack mounted in and on said truncated rear housing portion, a shaft rotatably horizontally mounted on and between said turret and said vertical turret axle, a pinion mounted within said turret and on said shaft rotating with said shaft and meshing with the aforesaid annular rack, a crank mounted on said shaft adapted to rotate said shaft and pinion and thereby rotate said turret axle and gun simultaneously.

5. In a safety motor vehicle the combination with a chassis of a closed armoured housing having a substantially truncated conical shaped enlarged rear portion mounted on said chassis, a ball bearing disposed around the outer face of the substantially annular top edge of said truncated rear housing portion, a rotating substantially hemispherical shaped gun turret mounted on said ball bearing, a vertical axle rotatably mounted at one end on the chassis and at its other end centrally engaging and carrying said turret, a gun mounted on said axle and rotating therewith, a seat mounted on said vertical axle below the gun and rotating therewith, an annular rack mounted in and on said truncated rear housing portion, a shaft rotatably horizontally mounted on and between said turret and said vertical turret axle, a pinion mounted within said turret on said shaft and meshing with said annular rack, and a crank mounted on said shaft adapted to rotate said shaft and pinion and thereby rotate the turret, axle, gun and seat simultaneously.

In testimony whereof I affix my signature.

ANTHONY TOMASSETTE.